United States Patent [19]

Haug et al.

[11] 4,169,461

[45] Oct. 2, 1979

[54] STORGE TANK ESPECIALLY SUITABLE FOR USE IN A SOLAR HEAT SYSTEM

[76] Inventors: Henry W. Haug, 7470 Boris St., Rohnert Park, Calif. 94928; Gary M. Shon, 5525 Hutchinson Rd., Sebastopol, Calif. 95472; Albert P. Lenhardt, 762 Pordon La., Healdsburg, Calif. 95448

[21] Appl. No.: 845,953

[22] Filed: Oct. 27, 1977

[51] Int. Cl.² .................................................. F24J 3/02
[52] U.S. Cl. ....................................... 126/437; 126/400
[58] Field of Search ................ 220/444, 445; 126/271, 126/400

[56] References Cited

U.S. PATENT DOCUMENTS

| | | | |
|---|---|---|---|
| 3,830,396 | 8/1974 | Jackson | 220/445 |
| 3,895,159 | 7/1975 | Yoshimura | 220/444 |
| 3,951,295 | 4/1976 | Guenther | 220/444 |
| 4,010,731 | 3/1977 | Harrison | 126/271 |
| 4,078,603 | 3/1978 | Saunders | 126/400 |

Primary Examiner—John J. Camby
Attorney, Agent, or Firm—Flehr, Hohbach, Test, Albritton & Herbert

[57] ABSTRACT

A storage tank especially suitable for use in a solar heat system utilizing water to store its collected heat is disclosed herein and includes a main body which defines an internal compartment for containing the water. This main body includes a composite inner layer for preventing the passage of water therethrough, an intermediate layer of thermal insulation having an R value between about R-20 and R-35 and outer layer for substantially preventing the passage of water therethrough. The storage tank when utilized as part of a solar heat system also includes an arrangement for passing water directly into and out of the internal compartment and an arrangement adapted to support at least one heat exchanger within the compartment.

28 Claims, 6 Drawing Figures

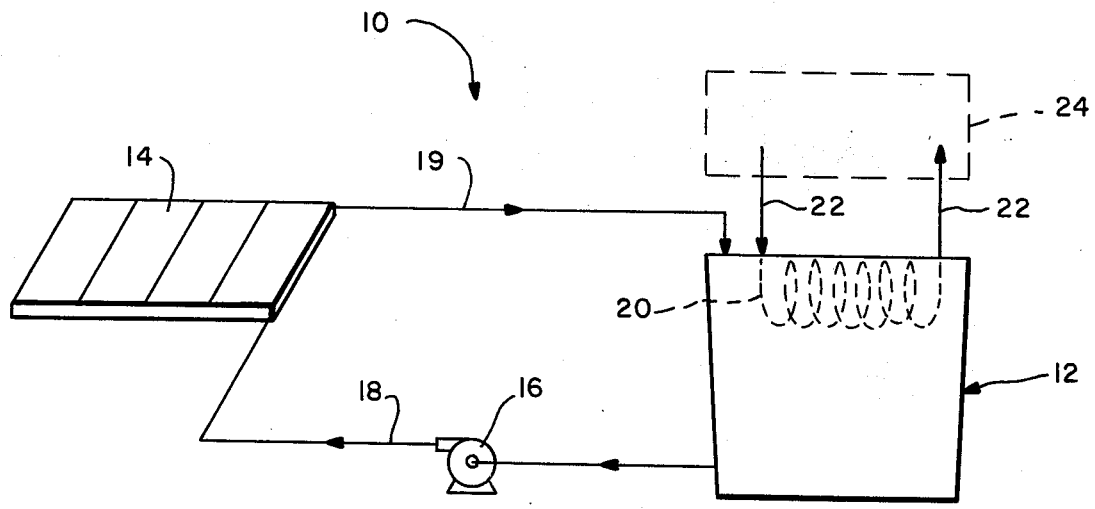
FIG.—1
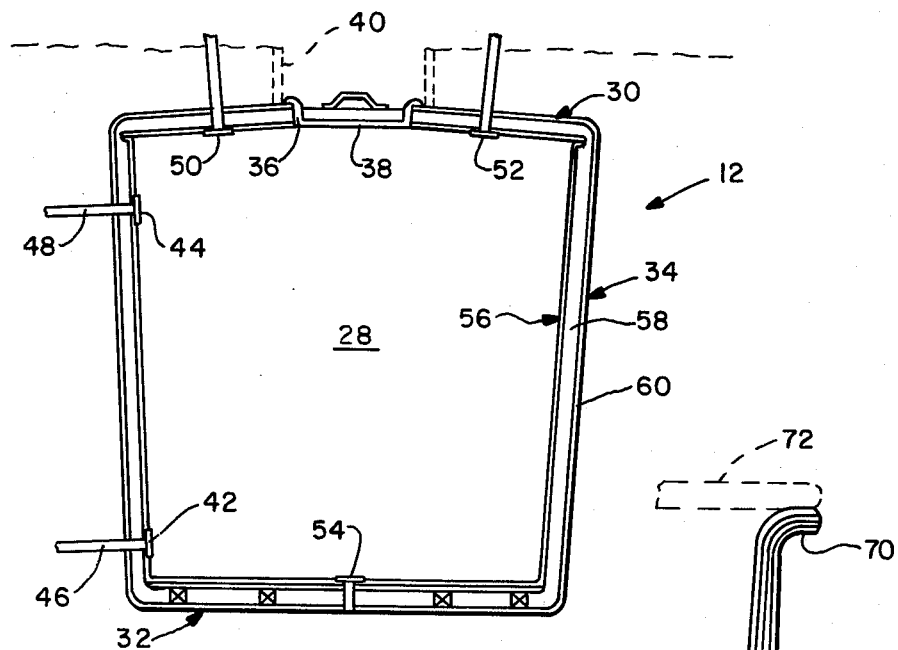
FIG.—2
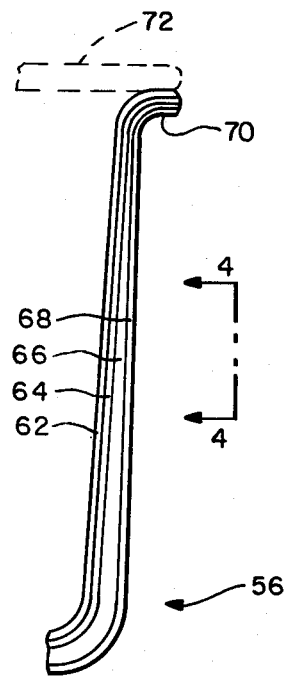
FIG.—3

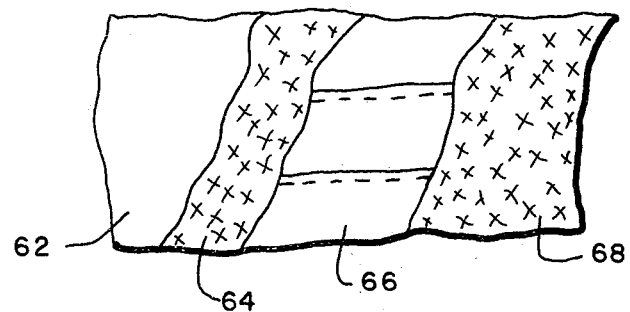
FIG.—4
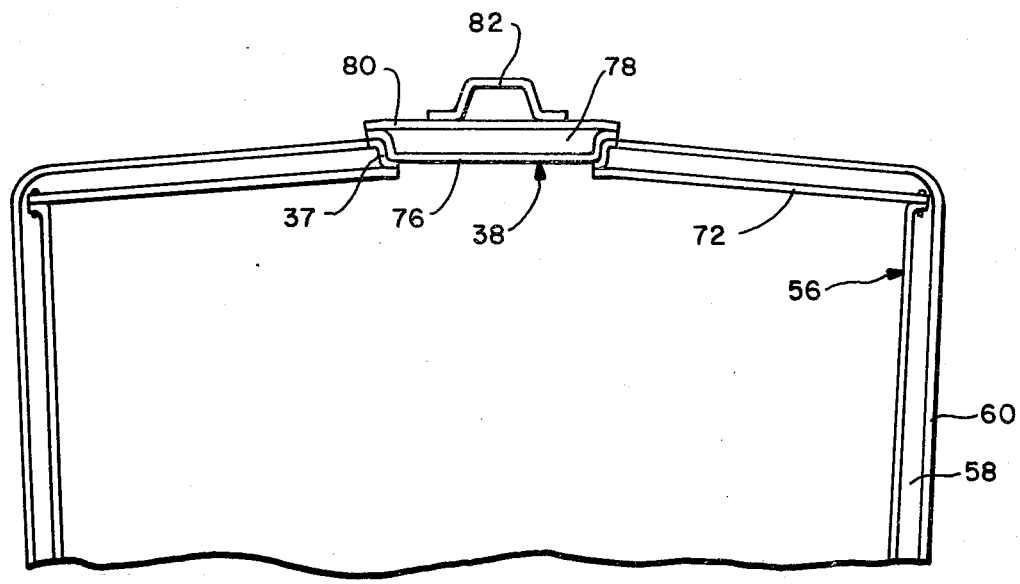
FIG.—5
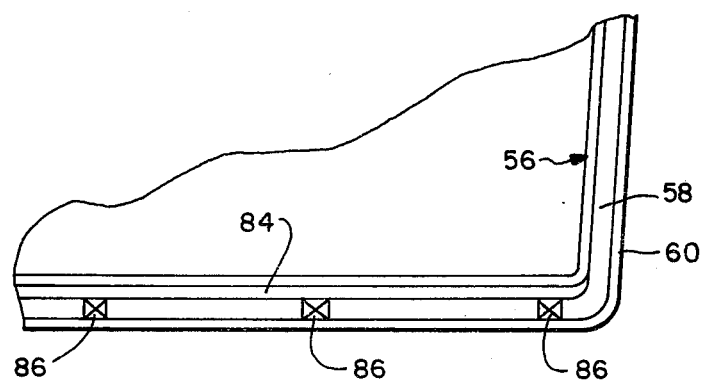
FIG.—6

STORGE TANK ESPECIALLY SUITABLE FOR USE IN A SOLAR HEAT SYSTEM

BACKGROUND OF THE INVENTION

The present invention relates generally to composite storage tanks and more particularly to a composite storage tank for use in a solar heat system utilizing water to store its collected heat.

There are most likely a number of different types of storage tanks presently being used in solar heat systems, especially systems utilizing water to store collected heat. Most of these tanks, if not all, are located above ground and, hence, do not have the advantages of below-ground insulation. One typical storage tank of this type, commonly referred to as a multi-piece tank, is constructed with exposed seams. While this particular type of tank may be more economical to construct than for example a seamless tank, any economic savings may and quite often is realized at the expense of structural integrity and leak resistance, as well as thermal insulation.

As will be seen hereinafter, the storage tank of the present invention is one which is especially suitable for use with and, in an actual working embodiment, is used in a solar heat system. As will also be seen, this tank is uncomplicated in design and relatively inexpensive to construct and yet it is structurally sound, leak-resistant and provides excellent thermal insulation. Moreover, this tank can be located under ground thereby taking advantage of below-ground insulation and, in a preferred embodiment, it is seamless, both internally and externally.

OBJECTS AND SUMMARY OF THE INVENTION

One object of the present invention is to provide an uncomplicated and relatively inexpensive storage tank which is especially suitable for use in a solar heat system utilizing water to store its collected heat.

Another object of the present invention is to provide a thermal insulated storage tank, specifically a solar storage tank, which displays a thermal insulation value (R value) of between about R-20 and R-35.

Still another object of the present invention is to provide a solar storage tank which can be readily located below ground without causing harm to the tank.

A further object of the present invention is to provide a leak resistant and structurally sound storage tank, particularly a solar storage tank, capable of containing as many as 3000 gallons of water.

The foregoing objects as well as other objects and features of the present invention will become apparent from a detailed description to follow. As will be seen, the storage tank of the present invention includes a main body which defines an internal compartment for containing water or the like and which is comprised of (1) an inner layer including means for preventing the passage of water therethrough, (2) an intermediate layer of thermal insulation having an R value of between about R-20 and R-35 and, (3) an outer layer including means for at least substantially preventing the passage of water therethrough. When used in a solar heat system, this tank also includes means extending through its body for the passage of water directly into and out of the internal compartment and means also extending through the body and adapted to support at least one heat exchanger within the internal compartment.

In accordance with one aspect of the present invention, as will be seen hereinafter, the main body of this storage tank is seamless throughout and in accordance with another aspect, the bottom of the tank is reenforced in a unique and yet uncomplicated and economical manner. Still other aspects of the present invention will become apparent hereinafter.

BRIEF DESCRIPTION OF THE DRAWINGS

FIG. 1 is a schematic illustration of a solar heat system utilizing water to store its collected heat and including a storage tank which is provided for storing the water and which is constructed in accordance with the present invention.

FIG. 2 is a vertical sectional view of the storage tank illustrated in FIG. 1.

FIG. 3 is an enlarged vertical sectional view of a portion of the storage tank shown in FIG. 2, particularly illustrating the inner wall structure of the tank.

FIG. 4 is a partially broken away vertical side view of the inner wall structure of FIG. 3 illustrating the various components making up this inner wall structure.

FIG. 5 is an enlarged sectional view of a top section of the storage tank illustrated in FIG. 2.

FIG. 6 is an enlarged sectional view of a bottom section of the storage tank shown in FIG. 2.

DETAILED DESCRIPTION AND PREFERRED EMBODIMENTS

Turning now to the drawings, wherein like components are designated by like reference numerals throughout the various figures, attention is first directed to FIG. 1. This figure illustrates a solar heat system 10 which utilizes water to store its collected heat and which includes a storage tank 12 for storing the heated water. With the exception of the storage tank to be described hereinafter, system 10 and all of the individual components making up this system may be conventional and readily provided by those with ordinary skill in the art.

For purposes of illustration, system 10 is shown to include a solar collector 14 which would be mounted in a suitable location for maxium exposure to the sun. A continuous flow of water is passed through the collector by suitable means, for example a conventional pump 16. As indicated by the arrows 18 in FIG. 1, relatively cold water is drawn out of the bottom of storage tank 12 by means of pump 16 and passed through the collector plate where it is heated and thereafter delivered back into the storage tank at or near its top end, as indicated by arrows 19. One or more heat exchangers 20 are suitably mounted within the storage tank at or near the top end of the latter. Water or other suitable means such as air, indicated by the arrows 22, is directed through the exchanger or exchangers where it is heated by the water within the tank and ultimately delivered to its point of destination, indicated generally at 24.

As stated above, system 10, with the exception of storage tank 12, is or may be conventional. The individual components just described, specifically collector plate 14, pump 16 and heat exchanger or exchangers 20 are conventional components of a solar heat system utilizing water to store its collected heat and hence can be readily provided by those with ordinary skill in the art. Moreover, it is to be understood that system 10 may require other conventional components which have not been illustrated. These other components, if required, could also be readily provided by those with ordinary skill in the art.

Turning now to FIG. 2, attention is specifically directed to storage tank 12 which is constructed in accordance with the present invention. This tank, as illustrated, includes a main body 26 which defines an internal compartment 28 and which may be separated into three sections, a top section 30, a bottom section 32 and side walls 34, actually one continuous side wall, extending between and connected to the top and bottom sections. In accordance with one aspect of the present invention, as will be seen hereinafter, main body 26 is thermally insulated to a value (standard R value) of between about R-20 and R-35. Moreover, in accordance with a second aspect of the present invention, main body 26 is seamless throughout its wall structure and, in accordance with still another aspect of the present invention, it is structurally reenforced at and near its bottom end section 32 in an uncomplicated and yet reliable manner, as will also be seen hereinafter.

In accordance with still another aspect of the present invention, an opening or manhole indicated at 36 is provided through top section 30 of main body 26 and is sufficiently large for an individual to pass through, whereby to provide ready access into compartment 28. In a preferred embodiment, this opening is defined by an annular rim 37 to be described in detail with respect to FIG. 5. A readily removable lid or manhole cover 38, also to be described hereinafter with respect to FIG. 5, is provided for closing the opening or manhole 36. As will be seen, storage tank 12 is especially suitable for use under ground, as illustrated in FIG. 2, by the dotted line indicating ground level. When the tank is so positioned, a suitable access extension, for example a sleeve 40, indicated by dotted lines, may be provided as part of the storage tank. This sleeve, as illustrated, would have one end which is connected to top section 30 in main body 26, circumscribing opening 36, while its other end would be located at or near ground level.

As stated previously, solar heat system 10 operates to withdraw water from storage tank 12, near its bottom, and to redirect this water, after it is heated, back into the storage tank, near its top end. The storage tank may include any suitable means for gaining access into and out of chamber 28 to accomplish this. As illustrated in FIG. 2, this is accomplished by means of two conventional bulk heat fittings 42 and 44, respectively. Fitting 42 extends through side wall 34 near bottom end section 32 and is adapted for connection to an outlet conduit 46 which directs water from chamber 28 to collector 14 by means of pump 16. It should be noted that because fitting 42 is located near the bottom of the storage tank, this eliminates the need for a self-priming pump. Fitting 44 is also located through side wall 44 near top section 30 and it is adapted for connection with an inlet conduit 48 which redirects the water, once heated at the collector, back into chamber 28. Storage tank 12 also includes means adapted to support one or more heat exchangers 20. Any conventional means to accomplish this may be readily provided such as bulk head fittings similar to those just described. Two such fittings, indicated at 50 and 52, are illustrated in FIG. 2. These fittings extend through the top section 30 of main body 26 and are provided for supporting one heat exchanger 20. Of course, additional bulk head fittings would be utilized for supporting additional heat exchangers.

Where storage tank 12 is located such that it can be drained gravitationally, a suitable drain plug, indicated generally at 54, would be provided. Where this is not possible, for example where the storage tank is located under ground in a way which does not allow gravitational drainage, a suitable pump, for example pump 16, may be provided to drain the tank, when necessary.

Having described storage tank 12 generally, attention is now directed to the particular construction of main body 26. As will be seen below, this main body includes (1) a composite inner layer 56 which prevents the passage of water therethrough and which provides structural integrity to main body 26, (2) an intermediate layer 58 which provides the thermal insulation needed to maintain the storage tank at the desired insulating value, and (3) an outer layer 60 which also prevents or at least substantially prevents the passage of water therethrough and which protects layer 58 from the external elements.

Turning to FIGS. 3 and 4, attention is specifically directed to composite inner layer 56. As illustrated, this composite inner layer includes a continuous innermost acrylic gelcoat 62 which is completely covered by a layer 64 of resin including uniformly dispersed glass fibers provided for reinforcement. Located over and completely covering layer 64 is a layer 66 of resin saturated glass mat which, in turn, is covered in its entirety with an outer layer 68 similar to layer 64, that is, a layer of resin including uniformly dispersed glass fibers provided for reinforcement. The gelcoat layer 62 in a preferred embodiment is made available by Cook Paint Company under Catalog No. NPG-943-L810. It acts as an internal water barrier and provides corrosion resistance to the interior of the tank. Layers 64, 66 and 68 also act as water barriers but also provide structural integrity to the overall tank.

In accordance with a preferred embodiment of the present invention, the resin utilized throughout the layers just described (apart from the gelcoat) is a polyester resin which is cured by any suitable means, for example methyl ethyl ketone (MEK) peroxide or other suitable catalist. In an actual working embodiment, the polyester resin is one purchased from Noriac Chemical Company under the trade name "Norox — 60% MEKP". The MEK peroxide was purchased by Koppers Company under the trade name "ISO-Resin No. 6060-5". It is to be understood, however, that the present invention is not limited to the particular polyester resin utilized or for that matter polyester resin generally, or the particular catalist recited but it may utilize other resins so long as they accomplish the objectives recited herein.

The preferred glass fibers utilized in layers 64 and 68 are the gun roving type which are chopped (into strands) between $\frac{3}{4}''$ and $1''$ in length. In an actual working embodiment, chopped glass strands manufactured by Pittsburgh Plate Glass Company under the trade name "Gun Roving - 528" and having a length of $1''$ were utilized. The particular glass mat comprising the part of layer 26, in the preferred embodiment of the present invention, is a woven glass roving which is approximately 18 oz./yd$^2$. In an actual working embodiment, the woven glass roving was manufactured by Owens-Corning Fiberglas Corp. under Catalog No. 73E55649 was utilized.

Composite inner layer 56 may be formed in any suitable manner but preferably is formed so as to be seamless throughout its construction. In an actual working embodiment, the composite inner layer was constructed in the following way. The gelcoat 62 was first formed by spraying a suitable acrylic mixture onto the outer surface of a forming mandrel appropriately shaped to define chamber 28. Thereafter, upon curing of the acrylic, a mixture of polyester and glass fibers, specifically the aforedescribed chopped strands, and of course a suitable catalist for the polyester, was sprayed over layer 62 to form layer 64, as illustrated best in FIG. 4. As also illustrated in this latter figure, layer 66 was formed by winding the aforedescribed glass fiber mat, sufficiently saturated with resin and a catalist, around layer 64 in an overlapped fashion, at least along side wall 34. Obviously the resin saturated glass fiber mat was not "wrapped" around the bottom but was actually pieced in place at that location. In a preferred embodiment, the resin saturated glass mat utilized along side wall 34 is progressively wound with greater overlaps as the winding continues down the side wall so as to provide a progressively thicker cross section. The outer layer 68 is provided in the same manner as the previously described layer 64, that is, a mixture of polyester resin, a catalist and glass fiber reinforcement is sprayed over layer 66.

It should be apparent from the foregoing, that composite layer 56 is a seamless, integral unit. However, it should be equally apparent that this composite layer is not formed with a top section. Rather a top section indicated at 72 in FIG. 3 is formed separately so that the forming mandrel can be removed from composite layer 56. This top section would be identical in construction to the construction of composite layer 56 just described, that is, it would include the previously described layers 62, 64, 66 and 68. However, once the top section is formed, an opening, specifically previously described manhole 36 and associated rim 37, would be provided through it. In this regard, it should be noted that the top end of composite layer 56 is formed with an integral outwardly flaring circumstantial flange 70. In order to close chamber 28, composite top section 72 is secured to the top of flange 70 as illustrated. Any suitable fastening means such as suitable adhesive material, for example the polyester resin and catalist referred to previously, may be utilized, either alone or in conjunction with one or more bolts (not shown). When bolts are utilized, appropriate holes would be drilled through flange 70 and top section 72.

As stated previously, composite layer 56 is preferably thicker at and near its bottom end than at or near its top end. This is because the bottom end is subjected to greater forces than the top end when chamber 28 is filled with water and hence to minimize material utilization and therefore overall cost, the composite layer comprising part of side wall 34 is tapered from its top end to its bottom end so that it is progressively thicker towards the bottom end. In an actual working embodiment, the top end of composite layer 56, just below flange 70, is approximately ½ inch and tapers linearly to approximately ¾ inch at its bottom end. The bottom section of layer 56, that is, the section comprising part of bottom section 32, is also ¾ inch thick in this actual working embodiment.

Having described composite layer 56, attention is now directed to intermediate layer 58 which, as stated previously, provides the thermal insulation for tank 12. This layer may be constructed of any thermal insulating material within reason, taking into account both economics and space as well as compatability with the other components making up the tank, so long as it provides a thermal insulation value between about R-20 and R-35. In a preferred embodiment of the present invention, this layer is comprised of urethane foam which is selected to provide an R value of approximately R-30. In an actual working embodiment of the present invention, 4 inches of flame retardant urethane foam having a density of 2.4 lbs. and an R-30 rating was utilized. This foam was manufactured by UpJohn Company under the trade name 152R.

In accordance with a preferred embodiment of the present invention, this layer 58 is provided intergrally around composite layer 56 including top section 72 but stopping at rim 37, thereby maintaining manhole 36. The insulation layer may be formed in any conventional manner. Where urethane foam or, for that matter, other types of foamed plastic material are utilized to make up layer 58, the layer can be readily sprayed over composite layer 56 in a conventional manner known to those with ordinary skill in the art.

Having formed layer 58, layer 68 may now be formed. As stated previously, this latter layer is provided for at least substantially preventing water or other external elements from passing therethrough and attacking insulation layer 58. Any means which will accomplish this in a practical and reliable manner could be utilized. However, in accordance with the preferred embodiment of the present invention, layer 60 is identical to previously described layers 64 and 68 of composite layer 56, that is, layer 60 is preferably a polyester resin having glass fibers dispersed throughout. This layer is formed in the same manner as layers 64 and 68 and, as illustrated in FIG. 2, it is formed completely around insulation layer 58 up to and stopping short of rim 37 defining manhole 36. In this preferred embodiment, layer 60 is between approximately 1/32nd inch and 1/16th inch thick. In an actual working embodiment it is 1/32nd thick inch thick and it is constructed of the same material as layers 64 and 68. Layer 60 may include an outermost, light opaque layer of conventional paint, sprayed or otherwise provided. This layer designated at 77 in FIG. 4 protects the underlayer against any harmful rays of the sun.

Having described body 26 of storage tank 12, attention is now directed to FIG. 5 which illustrates rim 37 and lid or manhole cover 38 in greater detail. As seen in this figure, the rim is a circumferential member which is somewhat S-shaped in axial section. This rim is constructed of any suitable rigid material but is preferably identical in construction to composite layer 56. It is suitably adhered, for example by a polyester and catalist, to top section 72 of inner layer 56, as best seen in FIG. 5. As also seen in this figure, the manhole cover 38 includes an innermost support frame 76 which is complimentary in shape to the rim 37. In fact, in a preferred embodiment of the present invention the rim tapers inwardly, as illustrated, as does support 76. In this way, the entire lid 38 can be force fitted into rim 37 for providing a tight fit for closing the manhole.

Support frame 76 may be of any suitable rigid material and is preferably identical in construction to composite layer 56, described previously and rim 37. As illustrated in FIG. 5, the support frame is filled with and supports insulation materials 78, preferably the same insulation material as layer 58, specifically urethane foam. Layer 78 is, in turn, covered with a top layer 80, preferably a layer identical to previously described layer 60. A handle 82 may be suitably connected to the lid, as illustrated.

Turning now to FIG. 6, attention is directed to another aspect of the present invention, specifically to an arrangement for reenforcing the bottom of storage tank 12. This arrangement, as illustrated in FIG. 6, includes rigid sheet material, specifically ¾" plywood in a preferred embodiment, and longitudinally extending rigid members, specifically 4×4 wooden beams in the preferred embodiment. The sheet material, which is generally designated by the reference number 84, is attached by any suitable means, for example the aforedescribed polyester resin and cooperating catalyst, to the underside of composite layer 56 such that it extends across bottom section 32 of main body 26. Obviously, the sheet material is so applied before layer 58 is formed. After attaching the sheet material in this manner and, again, before formation of layer 58, longitudinally extending, rigid members, generally designated at 86, are fastened to the underside of sheet 84, again by suitable means such as a polyester catalyst system. Thereafter, the insulation layer is formed around and between members 86 so as to embed the sheet 84 and these members in the manner illustrated. It has been found that this method of reenforcing the bottom of the storage tank 12 improves the structural integrity of the tank substantially.

Having described storage tank 12 in its preferred embodiment, it should be quite apparent that its composite but seamless design provides structural integrity and leak resistance. The fact that the intermediate insulation layer, specifically the urethane foam insulation, is sealed between the aforedescribed inner and outer layers, prevents accumulation of moisture within the insulation and protects the insulation properties of the foam generally. Moreover, the tank can be readily installed under ground and thereby take advantage of below ground insulation without adversely affecting the urethane.

What is claimed is:

1. In a solar heat system utilizing water to store its collected heat, a storage tank for storing said water, said storage tank comprising:
   (a) a body defining an internal compartment for containing said water, said body including
      (i) a composite inner layer including an innermost gelcoat lining and a plurality of combination glass-resin sublayers for preventing the passage of water therethrough and providing reinforcement thereto,
      (ii) an intermediate layer of foamed plastic thermal insulation having an R value of between about 20 and 35, and
      (iii) an outer layer integrally formed around said intermediate layer and including means for substantially preventing the passage of water therethrough,
   (b) first means extending through said body for the passage of water directly into and out of said compartment; and
   (c) second means extending through said body, said second means being adapted to support at least one heat exchanger within said compartment.

2. A storage tank according to claim 1 wherein said body includes an opening extending therethrough, said opening being sufficiently large for an individual to pass through, whereby to provide access into said compartment, said storage tank including:
   (d) a lid removably positioned within said opening for closing the latter.

3. A storage tank according to claim 2 wherein said lid includes:
   (i) a composite inner layer including means for preventing the passage of water therethrough,
   (ii) an intermediate layer of thermal insulation having an R value of between about 20 and 35, and
   (iii) an outer layer including means for preventing the passage of water therethrough.

4. A storage tank according to claim 2 wherein said intermediate layer includes foamed plastic thermal insulation integrally formed around said composite inner layer and wherein said outer layer is integrally formed around said intermediate layer.

5. A storage tank according to claim 1 wherein said body includes a top end section, a bottom end section and sidewall means extending between and connected to said top and bottom end sections, said storage tank including:
   (e) means other than said inner layer, intermediates layer and outer layer, said last-mentioned means being located within said bottom end section for reinforcing the latter.

6. A storage tank according to claim 5 wherein said reinforcing means includes
   (i) a sheet of rigid material extending across said bottom end section and connected to the outermost surface of said inner layer between said inner layer and said intermediate layer, and
   (ii) a plurality of longitudinally extending rigid members located within said intermediate layer of thermal insulation, said members being fastened to and extending across the outermost surface of said sheet of rigid material.

7. A storage tank according to claim 1 wherein said body includes a top end section, a bottom end section and sidewall means extending between and connected to said top and bottom end sections, each of said sections and sidewall means including said inner, outer and intermediate layers, and wherein the composite inner layer of said sidewall means tapers in thickness between said top end section and said bottom end section, said composite inner layer being thicker at said bottom end section.

8. A storage tank according to claim 1 wherein said composite layer includes
   (i) a first innermost acrylic gel coat layer,
   (ii) a second layer of resin having glass fibers dispersed throughout for reinforcement,
   (iii) a third layer of resin saturated glass mat, and
   (iv) a forth layer of resin having glass fibers dispersed throughout for reinforcement.

9. A storage tank according to claim 8 wherein the resin in said last-mentioned layers comprising said composite innermost layer is a polyester resin and wherein said glass mat in said third layer is a woven glass roving.

10. A storage tank according to claim 9 wherein said composite inner layer is between approximately ¼ and ¾ inch thick.

11. A storage tank according to claim 1 wherein said intermediate layer includes foamed plastic thermal insulation.

12. A storage tank according to claim 1 wherein said foamed plastic insulation is urethane foam.

13. A storage tank according to claim 12 wherein said urethane foam is between approximately 3 and 5 inches thick.

14. A storage tank according to claim 1 wherein said outer layer includes a layer of resin including glass fibers dispersed throughout for reinforcement.

15. A storage tank according to claim 14 wherein said outer layer includes an outermost layer of light opaque paint.

16. A storage tank according to claim 14 wherein said outer layer is between approximately 1/32 and 1/16 inch thick.

17. In a solar heat system utilizing water to store its collected heat, a storage tank for storing said water, said storage tank comprising:
(A) a body defining an internal compartment for containing said water, said body including
 (i) a composite inner layer including
  (a) a first innermost acrylic gel coat layer,
  (b) a second layer of polyester having glass fibers dispersed throughout for reinforcement,
  (c) a third layer of polyester saturated glass mat, and
  (d) a fourth layer of polyester having glass fibers dispersed throughout for reinforcement,
 (ii) an intermediate layer of urathane foam having an R value of between about 20 and 35, and
 (iii) an outer layer including
  (a) an innermost layer of polyester having glass fibers dispersed throughout for reinforcement, and
  (b) an outermost layer of light opaque paint;
(B) first means extending through said body for the passage of water directly into and out of said compartment; and
(C) second means extending through said body, said second means being adapted to support at least one heat exchanger within said compartment.

18. A storage tank according to claim 17 wherein said body includes an opening extending therethrough, said opening being sufficiently large for an individual to pass through, whereby to provide access into said compartment, said storage tank including:
(A) a lid removably positioned with said opening for closing the latter, said lid including
 (i) a composite inner layer including means for preventing the passage of water therethrough,
 (ii) an intermediate layer of thermal insulation having an R value of between about 20 and 35, and
 (iii) an outer layer including means for preventing the passage of water therethrough.

19. A storage tank according to claim 18 wherein said body includes a top end section, a bottom end section and sidewall means extending between and connected to said top and bottom end sections, said storage tank including:
(A) means other than said inner layer, intermediate layer and outer layer of said body, said last-mentioned means being located within said bottom end section for reinforcing the latter, said last mentioned means including
 (i) a sheet of rigid material extending across said bottom end section and connected to the outermost surface of said inner layer between said inner layer and said intermediate layer, and
 (ii) a plurality of longitudinally extending rigid members located within said intermediate layer of thermal insulation, said members being fastened to and extending across the outermost surface of said sheet of rigid mterial.

20. A storage tank according to claim 19 wherein the composite inner layer of said sidewall means tapers in thickness between said top end section and said bottom end section, said inner layer being thicker at said bottom end section.

21. A storage tank according to claim 20 wherein the thickness of said composite inner layer is between approximately ⅛ and ¾ inch thick and wherein said layer of urathane foam is between about 3 and 5 inches thick.

22. A storage tank according to claim 21 wherein said thermal insulation lay in said body has an R value of about 30.

23. A storage tank comprising:
(a) a body including a top end section, a bottom end section and sidewall means extending between and connected to said top and bottom end sections, said body defining an internal compartment, said body including
 (i) a composite inner layer including means for preventing the passage of water therethrough,
 (ii) an intermediate layer of thermal insulation having an R value of between about 20 and 35, and
 (iii) an outer layer including means for preventing the passage of water therethrough,
(b) means for reinforcing said bottom end section, said last-mentioned means including
 (i) a sheet of rigid material extending across said bottom end section and connected to the outermost surface of said inner layer between said inner layer and said intermediate layer, and
 (ii) a plurality of longitudinally extending rigid members located within said intermediate layer of thermal insulation, said members being fastened to and extending across the outermost surface of said sheet of rigid material.

24. A storage tank according to claim 23 wherein said sheet is plywood and said members are solid wooden beams.

25. In a solar heat system utilizing water to store its collected heat, a storage tank for storing said water, said storage tank comprising:
(a) a body defining an internal compartment for containing said water, said body including a top end section, a bottom end section and sidewall means extending between and connected to said top and bottom end sections, each of said sections and sidewall means including
 (i) a composite inner layer including means for preventing the passage of water therethrough, said inner layer tapering in thickness between said top end section and said bottom end section and being thicker at said bottom end section;
 (ii) an intermediate layer of thermal insulation having an R value of between about 20 and 35, and
 (iii) a outer layer including means for substantially preventing the passage of water therethrough,
(b) first means extending through said body for the passage of water directly into and out of said compartment; and
(c) second means extending through said body, said second means being adapted to support at least one heat exchanger within said compartment.

26. In a solar heat system utilizing water to store its collected heat, a storage tank for storing said water, said storage tank comprising:
(a) a body defining an internal compartment for containing said water, said body including (i) a composite inner layer including a first innermost acrylic gel coat layer, a second layer of resin having glass fibers dispersed throughout for reinforcement, a third layer of resin saturated glass mat, and a fourth layer of resin having glass fibers dispersed throughout for reinforcement;

(ii) an intermediate layer of thermal insulation having an R value of between about 20 and 35, and (iii) an outer layer including means for substantially preventing the passage of water therethrough, (b) first means extending through said body for the passage of water directly into and out of said compartment; and (c) second means extending through said body, said second means being adapted to support at least one heat exchanger within said compartment.

27. In a solar heat system utilizing water to store its collected heat, a storage tank for storing said water, said storage tank comprising:

(a) a body defining an internal compartment for containing said water, said body including a top section, a bottom end section and sidewall means extending between and connected to said top and bottom end sections, each of said sections including (i) a composite inner layer including means for preventing the passage of water therethrough, (ii) an intermediate layer of thermal insulation having an R value of between about 20 and 35 and (iii) an outer layer including means for substantially preventing the passage of water therethrough, (b) first means extending through said body for the passage of water directly into and out of said compartment;

(c) second means extending through said body, said second means being adapted to support at least one heat exchanger within said compartment; and (d) means other than said inner layer, intermediate layer and outer layer, said last-mentioned means being located within said bottom end section for reinforcing the latter and including (i) a sheet of rigid material extending across said bottom end section and connected to the outermost surface of said inner layer between said inner layer and said intermediate layer, and (ii) a plurality of longitudinally extending rigid members located within said intermediate layer of thermal insulation, said members being fastened to and extending across the outermost surface of said sheet of rigid material.

28. In a solar heat heat system utilizing water to store its collected heat, a storage tank for storing said water, said storage tank comprising:

(a) a body defining an internal compartment for containing said water, said body including a top end section, a bottom end section and sidewall means extending between and connected to said top and bottom end sections, said sidewall means including a composite inner layer including means for preventing the passage of water therethrough, said inner layer tapering in thickness between said top end section and said bottom end section and being thicker at said bottom end section;

(b) first means extending through said body for the passage of water directly into and out of said compartment; and (c) second means extending through said body, said second means being adapted to support at least one heat exchanger within said compartment.

* * * * *